Sept. 9, 1952 R. D. ANANSON 2,610,014
SUPPORT
Filed Nov. 20, 1946
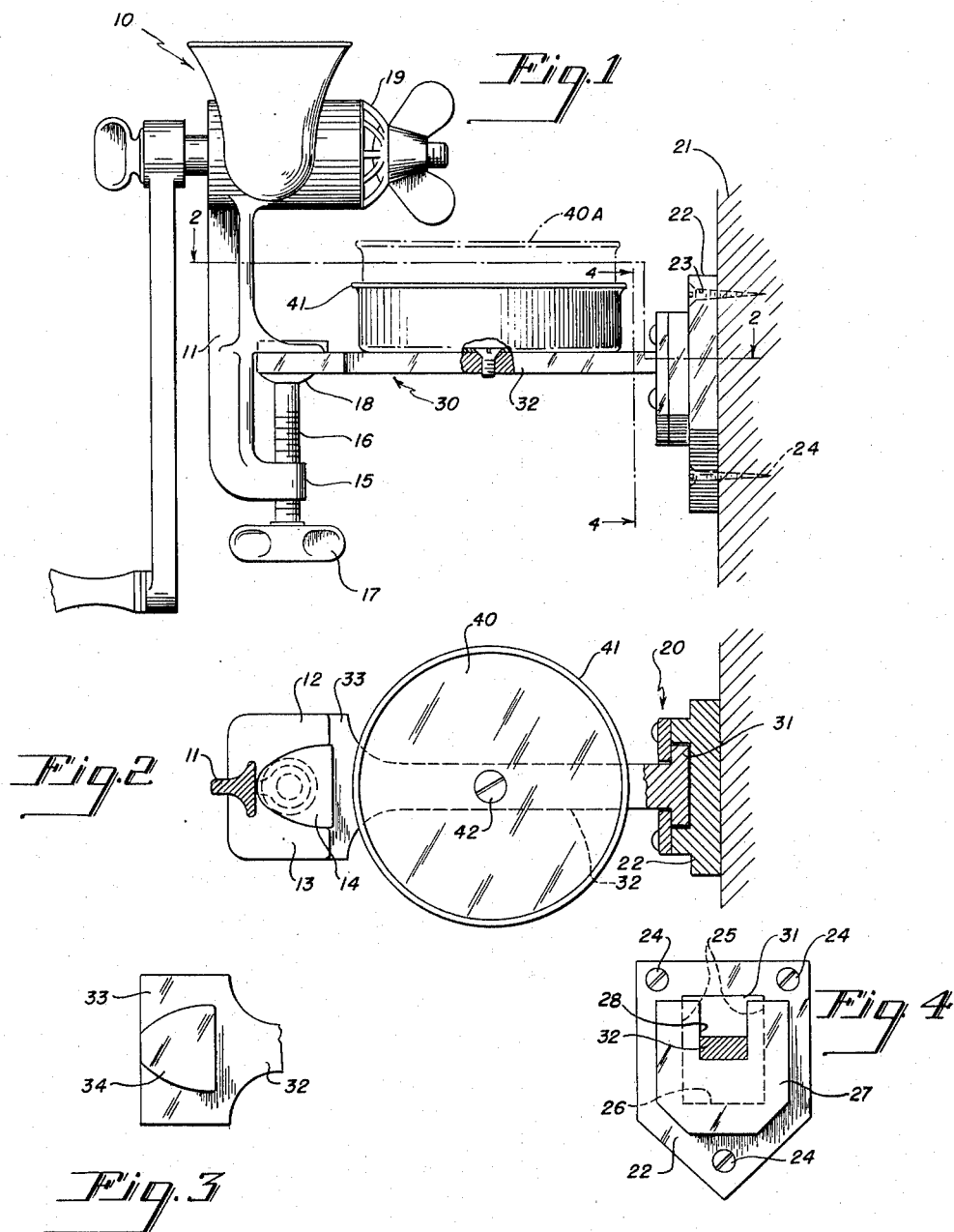
INVENTOR
Richard D. Ananson
BY
E. W. Marshall
ATTORNEY Patented Sept. 9, 1952

2,610,014

UNITED STATES PATENT OFFICE 2,610,014

SUPPORT

Richard D. Ananson, Stirling, N. J., assignor, by mesne assignments, to Harry Tashjian, Paterson, N. J.; John Begian and Peter Cohn, executors of said Harry Tashjian, deceased Application November 20, 1946, Serial No. 710,966

1 Claim. (Cl. 248—226)

My invention relates to an improved support, and its object is to provide a simple, inexpensive device for holding an article such as a meat chopper on a wall socket.

According to common practice, a meat chopper of standard construction is provided with a clamp which has a number of spaced projecting arms adapted to rest on the upper surface of a table, cabinet or shelf, and a threaded shank in a part of the body of the chopper under these projecting arms adapted to be forced against the under side of the article to which the chopper is applied. Such arrangement is unsatisfactory, because the position in which the chopper is held is not always a convenient one for manipulating it, the edge of a kitchen table which has an enameled metallic top being usually raised above the upper surface of the table and does not afford a good support for the projecting arms of the clamp, and these arms of the clamp are apt to mark the surface of a finished table, cabinet or chair, and there is no way of holding a receptacle for receiving the matter ejected from the chopper in a definite fixed position in relation to the chopper.

My purpose is to overcome these features and to provide an arrangement for holding a chopper in a convenient position most suitable for its operation and for holding a receiving receptacle in its most effective position.

A further object is to so arrange the parts that they may be quickly and easily affixed to, and as quickly and easily removed from, a desired structure.

These and other objects of the invention will appear in the following specification, in which I will describe a preferred embodiment of the invention and will point out its novel features in appended claim.

Referring to the drawings:

Fig. 1 is a side elevation of a meat chopper of a standard construction, and a support therefor which is made according to and embodies my invention;

Fig. 2 is a sectional plan view of the device shown in Fig. 1, the section being taken on the broken line 2—2 of Fig. 1;

Fig. 3 is a plan view of a portion of one of the parts shown in the preceding figures; and Fig. 4 is an end elevation of a wall socket shown in Figs. 1 and 2, with one of the parts of my device shown therein and in section, the section of this figure being taken on the line 4—4 of Fig. 1.

10 designates a meat chopper of a standard construction, having a frame 11, from one side of which a pair of arms 12, 13 extend, forming a space 14 between them. The lower end of the frame below the arms 12, 13 extends forwardly as at 15. In it is an internally threaded bore, centrally disposed in which is a threaded shank 16. 17 is an actuating handle on the lower end of the shank, and 18 is a clamping head rotatably supported on the upper end of the shank. The circular discharge outlet of the chopper is designated by 19. The parts thus briefly described form no part of my invention.

For supporting such a device on a wall I have provided a socket 20, which may be permanently affixed to a wall 21 in a convenient location and at a desired height from the floor. The socket has a flat base 22, in which are holes 23 for the reception of screws 24, by means of which the socket is affixed to the wall. A continuous rib projects from the outer surface of the base, the inside of which has spaced parallel sides 25, and a surface 26 normal to the sides. 27 is a plate on the outside of the rib, the inner surface of which is parallel with and spaced from the outer surface of the base 22. This forms a rectangular pocket closed on its sides and open at the top. A rectangular opening 28 is formed in the central part of the plate somewhat less in width than the width of the pocket, and extending from the top of the plate to a point intermediate the top of the plate and the bottom of the pocket formed by the surface 26. In the drawings, the plate is shown as a part affixed to the rib, but the socket may be formed of one integral body, if desired.

30 designates a bracket having a flange 31 of approximately the same outer dimensions as the inner dimensions of the pocket and adapted to form a sliding fit therewith. 32 is an arm extending outwardly from the outer surface of the flange 31. This arm is of rectangular cross-section and has a lateral dimension slightly smaller than that of the opening 28 in the plate 27. At the outer end of arm is a laterally widened portion 33, the width of which is substantially the same as the distance between the outer edges of the arms 12, 13 (see Fig. 2). 34 is a lug projecting upwardly from the surface of the widened portion 33 of the bracket. This lug is dimensioned to be contacted by the inner edges of the arms 12, 13, and is preferably shaped to conform to the shape of the opening 14.

A receptacle 40 is affixed to the bracket intermediate its flange 31 and its widened end portion 33. This is preferably in the form of a shallow dish, having an upstanding flange 41. The means of attaching it preferably is a screw 42 passing through the receptacle and engaging the arm 32 so that the receptacle may be removed from the bracket whenever desired.

When the projecting arms are placed upon the widened portion 33 of the bracket with their inner edges abutting the lug 34, the chopper 10 is accurately positioned on the bracket with the axis of its discharge opening 19 in alinement with the arm 32 and intercepting the axis of the receptacle 40. It may be clamped to the bracket by forcing the clamping head 18 against the under side of the widened portion of the bracket by turning the shank 16. Then, by inserting the flange 31 in the pocket formed in the socket 20, the chopper will be firmly supported on the wall in a position where it can be manipulated easily, and with the receptacle 40 properly located to receive matter ejected from the chopper. When thus supported, both of the operator's hands are free to manipulate the chopper. Obviously, the removable receptacle, shown at 40A in Fig. 1, may be supported on the receptacle 40 if desired. The chopper and the bracket may be removed readily from the socket, and, if desired, the chopper may be removed from the bracket.

Various modifications in construction, mode of operation, method and use of an invention may and do occur to others, especially after benefiting from knowledge of such a disclosure as that herein presented of the principles involved, but the invention itself is not confined to the present showing.

I claim:

A rigid frame, a clamp formed thereon comprising a pair of spaced arms projecting laterally from one side of the frame, said arms having flat under surfaces lying in a common plane, an internally threaded boss below and between said arms near the junction of said arms with the frame with an externally threaded shank in said boss parallel with the part of the frame from which the arms project, a bracket comprising an arm having a substantially flat enlarged upper surface near its outer end receiving the arms of the clamp, a centrally disposed upstanding lug, shaped to fit the space between the arms of the clamp, and having a substantially flat widened flange at its inner end, at right angles to said flat enlarged surface near its outer end combined with a wall socket having a pocket formed therein adapted to receive and hold the flange at the inner end of said bracket.

RICHARD D. ANANSON.

REFERENCES CITED

The following references are of record in the file of this patent:

UNITED STATES PATENTS

| Number | Name | Date |
| --- | --- | --- |
| 323,380 | Whissemore | July 28, 1885 |
| 787,119 | Scott | Apr. 11, 1905 |
| 831,629 | Rollman | Sept. 25, 1906 |
| 837,221 | Hall | Nov. 27, 1906 |
| 1,247,933 | Curtenius | Nov. 27, 1917 |
| 1,977,431 | Isles | Oct. 16, 1934 |

FOREIGN PATENTS

| Number | Country | Date |
| --- | --- | --- |
| 34,915 | Sweden | May 28, 1913 |